E. P. DU PONT.
FUEL FEEDING SYSTEM FOR INTERNAL COMBUSTION ENGINES.
APPLICATION FILED JULY 30, 1919.

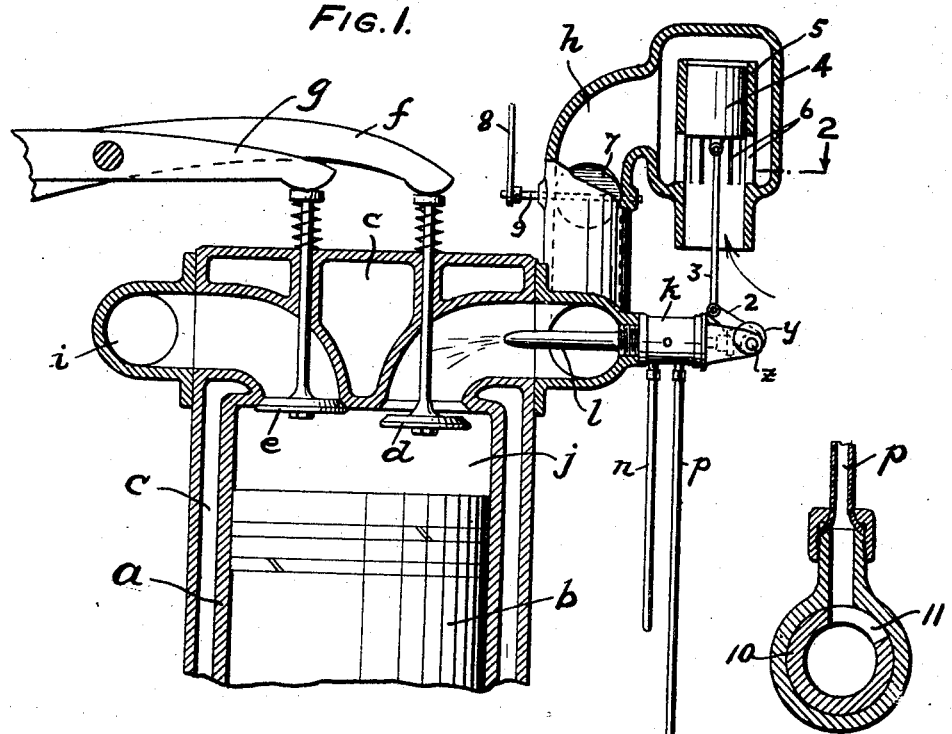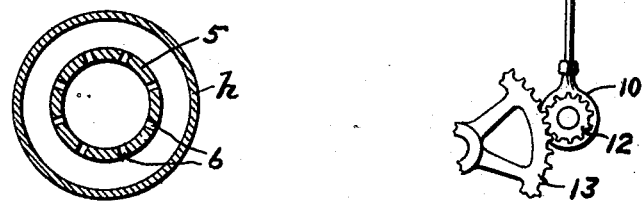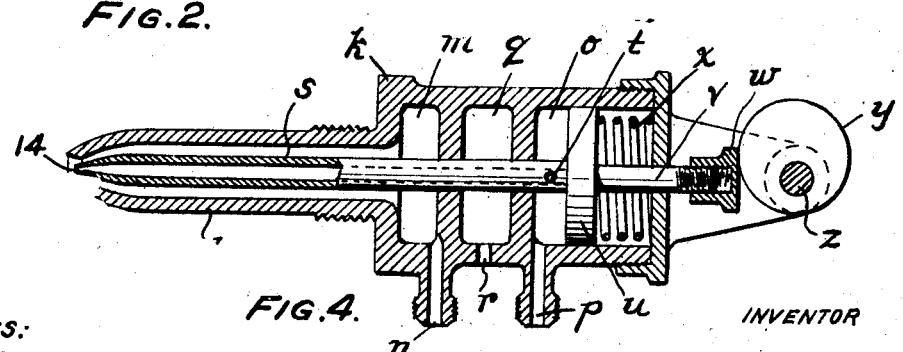

1,402,749.

Patented Jan. 10, 1922.
2 SHEETS—SHEET 2.

WITNESS:

INVENTOR
Eleuthere Paul du Pont
BY
Frank J. Busser
ATTORNEY.

UNITED STATES PATENT OFFICE.

ELEUTHERE PAUL du PONT, OF MONTCHANIN, DELAWARE.

FUEL-FEEDING SYSTEM FOR INTERNAL-COMBUSTION ENGINES.

1,402,749.     Specification of Letters Patent.     Patented Jan. 10, 1922.

Application filed July 30, 1919. Serial No. 314,299.

*To all whom it may concern:*

Be it known that I, ELEUTHERE PAUL DU PONT, a citizen of the United States, residing at Montchanin, county of New Castle, and State of Delaware, have invented a new and useful Improvement in Fuel-Feeding Systems for Internal-Combustion Engines, of which the following is a full, clear, and exact description, reference being had to the accompanying drawings, which form a part of this specification.

The object of my invention is to provide means whereby the less volatile oils of petroleum may be used as fuel in internal combustion engines.

In accordance with my invention, I provide means for the admission of oil and air to the engine on its intake stroke and further provide means automatically controlling the amount of oil and air admitted to the varying needs of the engine at high speed and under load, so that the mixture will be correct and combustion complete, thus obtaining the maximum of power and a minimum of carbon deposit.

Referring to the accompanying drawings in which—

Fig. 1 is a sectional view of an engine equipped with my device.

Fig. 2 is a section on line 2 of Fig. 1.

Fig. 3 is a section of an air valve.

Fig. 4 is a sectional view of the atomizer.

Figure 5:
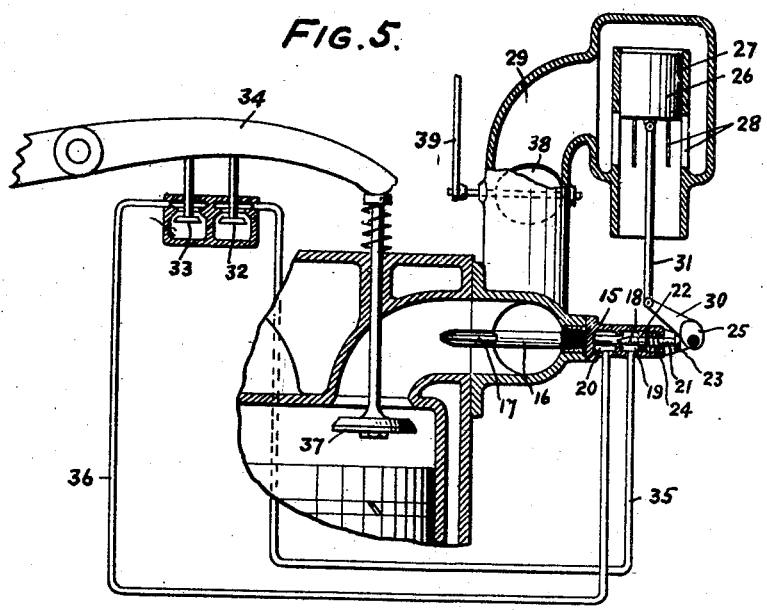
Fig. 5 is a more or less diagrammatic view of a modification of my device.

Referring to Figures 1 to 4, the cylinder $a$, in which is the piston $b$, is water jacketed as at $c$ and is provided with the inlet valve $d$ and the exhaust valve $e$, operated by the suitably mounted rocker arms $f$ and $g$ respectively, and opening from the inlet manifold $h$ and exhaust manifold $i$ into the combustion chamber $j$.

The atomizer $k$ having the nozzle $l$ is fitted into the intake manifold. The atomizer is provided with a chamber $m$ into which oil is led through a pipe $n$ and a chamber $o$ into which compressed air is led through a pipe $p$, in which is placed the rotary valve 10, having the port 11 suitably timed to and driven by the engine through the gears 12 and 13. The chamber $q$, provided with an outlet $r$, is placed between chambers $m$ and $o$ to catch and exhaust any leakage of air from chamber $o$ and prevent its getting into the oil chamber. The atomizer is provided with the hollow needle valve $s$, having an opening 14 in its point, extending transversely through the chambers $m$ and $q$ and into the chamber $o$ and adapted to close the nozzle $l$. The needle valve is provided with the aperture $t$ and terminates in the circular head $u$ which acts as a piston in the chamber $o$. A stem $v$ extends from the piston out through the rear of the chamber $o$ and terminates in the adjusting nut $w$. The spring $x$ is placed in the chamber behind the piston and tends to maintain the needle valve in forward position to close the atomizer nozzle.

A metering cam $y$ is mounted on a shaft $z$ adjacent to and adapted to act on the adjusting nut $w$ at the end of the needle valve stem $v$. The arm 2 and link 3 connect the cam to a metering piston 4 working in a cylinder 5 in the intake manifold. The cylinder is provided with ports 6, which are adapted to be covered and uncovered by the piston 4.

The butterfly valve 7 is suitably placed in the intake manifold and is controlled through any convenient connections to the arm 8 carried by the valve stem 9.

In operation, when the engine is at rest, the valve 10 is timed with the engine so that the port 11 will be open to the pipe $p$ during the intake stroke of the engine. The needle valve $s$ under pressure of the spring $x$ upon the head or piston $u$ will close the nozzle $l$ of the atomizer, the chamber $m$ and the nozzle of the atomizer being full of oil supplied through the pipe $n$ by gravity or other means.

The metering piston 4 will be at the bottom of its stroke, placing the metering cam $y$ just in contact with the adjusting screw $w$ on the needle valve stem $v$.

When the engine is started the butterfly valve 7 is slightly opened. On the intake stroke of the engine the intake valve $d$ is opened and air is drawn into the intake manifold through the ports 6, the suction of piston $b$ causing the metering piston 4 to rise in cylinder 5 and partially uncover the ports. The movement of the metering piston causes metering cam $y$ to be turned slightly away from contact with the needle valve stem. As the intake valve opens on the intake stroke, valve 10 is opened, and compressed air, supplied from any convenient source, passes through the port 11 into pipe *p* and into chamber *o*. Due to the restricted outlet from chamber *o*, through aperture *t* and opening 14 in the needle valve, pressure is built up which acts on piston *u*, forcing it back, against the pressure of spring *x*, and causing the needle valve to open nozzle *l*. This movement continues until screw *w* again contacts with cam *y*. Nozzle *l* being open, the oil flows out and is atomized by the air which is all the while passing out of the opening 14 in the needle valve. The oil thus finely divided passes into the intake manifold where it mixes with the air entering through the ports 6. At the end of the intake stroke the valve 10 closes, shutting off the compressed air and the spring *x* is enabled to return the needle valve to closed position. Metering piston 4 drops and cam *y* contacts with screw *w* and prevents the needle valve from opening.

As the engine is speeded up, or more power is required, the butterfly valve is opened wider and the suction on piston 4 is increased causing it to rise higher, admit more air through ports 6 and turn cam *y* to permit increased movement of needle valve *s*, thus allowing more oil to flow from nozzle *l*.

The ports 6 and piston 4 are so arranged in connection with the metering cam as to automatically regulate the relative proportions of air and oil passing to the combustion chamber for any position of butterfly valve 7, the supply of compressed air being constant.

Referring to Figure 5, in which a modified form of my invention is shown, the atomizer 15 is provided with a nozzle 16 and a fixed hollow central tube 17, provided at its rear end with a needle valve 18, located in a chamber 19, a chamber 20 being located at the base of the nozzle 16. The needle valve 18 is provided with a stem 21, upon which is mounted a piston 22, extending through the rear wall of chamber 19 and having upon its end an adjusting screw 23. A spring 24 is placed to act on piston 22 to maintain the needle valve closed. A metering cam 25, suitably placed to act on screw 23, is connected with a metering piston 26, mounted in cylinder 27, having ports 28, in intake manifold 29, through arm 30 and link 31. A supply of compressed air and oil is led to chambers 19 and 20 through valves 32 and 33 respectively, which are operated by the intake valve rocker arm 34, and pipes 35 and 36.

In operation, on the intake stroke of the engine the rocker 34 opens intake valve 37 and air and oil valves 32 and 33 admitting air to needle valve 18 and oil to chamber 20 from which it passes out of the orifice between the nozzle 16 and central tube 17. The air pressure acting on piston 22 tends to open the needle valve, the opening being limited by the metering cam 25 controlled by metering piston 26 as in the description of Figures 1 to 4. The air then passes through the hollow central tube 17 and atomizes the oil into the manifold where it is mixed with the air entering through ports 28.

The relative proportions of air and oil are adjusted through the control by the metering piston 26 of the ports 28 and the needle valve 18. The metering piston being regulated to the needs of the engine by the butterfly valve 38 controlled through the arm 39 and any suitable connections.

Figure 6:
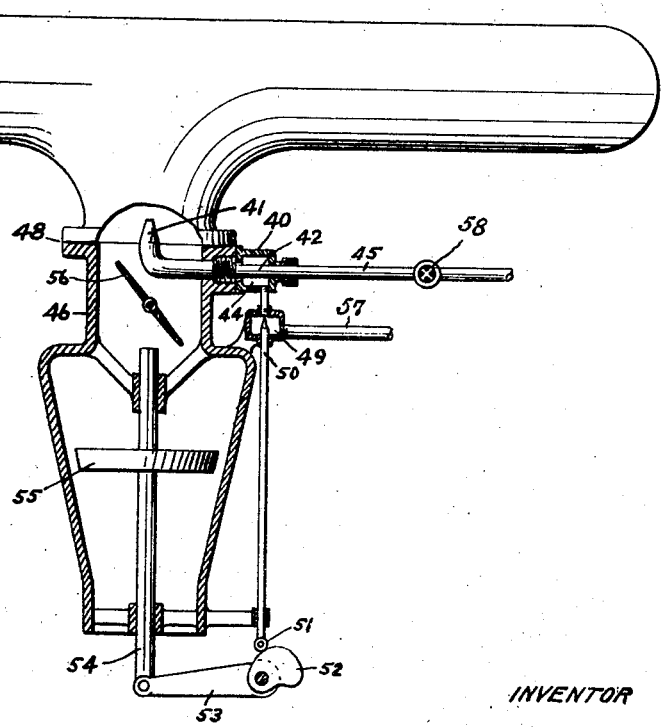
Fig. 6 is a view partly in section of a further modification of my device.

Referring to Figure 6 in which I show a further modification of my invention, the atomizer 40, having the upturned nozzle 41 and the fixed central tube 42, is let into the casing 46 adapted to be connected to the intake manifold 43 as at 48. An oil supply is led into chamber 44 in connection with the nozzle 41 through pipe 57 and a compressed air supply is led into the fixed central tube 42 through pipe 45, in which is placed the shut-off valve 58. The chamber 49 containing the needle valve 50 is placed in the oil pipe. The stem of the needle valve is extended and provided on its end with the roller 51, adjacent to which is suitably mounted the metering cam 52. The arm 53 connects the cam with the rod 54 upon which is mounted the metering piston 55, the rod 54 is mounted in the casing 46 and is adapted to vertical movement, which will impart a rotary movement to cam 52 to limit the movement of the needle valve 50. The butterfly valve 56 is mounted in the casing to control the speed of the engine.

In operation, air is drawn by the engine into the intake manifold through casing 46, causing metering piston 55 to be raised, thus moving cam 52 and permitting needle valve 50 to be open admitting oil to the atomizer. A constantly flowing current of compressed air passes through the central tube of the atomizer and atomizes the oil, which passes into the engine.

The above modification adapts my invention to a form of carburetor, for use in connection with engines of four or more cylinders, wherein the admission of air is continuous due to the fact that one of the cylinders is always on the suction or admission stroke.

Having now fully described my invention, what I claim and desire to protect by Letters Patent is:—

1. In combination with an internal combustion engine, a fuel nozzle, a hollow needle valve within the fuel nozzle, means providing an auxiliary air supply, and means controlled by said auxiliary air supply means for regulating the needle valve.

2. In combination with an internal combustion engine, an atomizer for fuel, means for supplying oil and compressed air to the atomizer, an auxiliary air inlet, means operable from said engine to control the admission of the compressed air to the atomizer, and means operable by the suction on said auxiliary air inlet to control the admission of the oil.

3. In combination with an internal combustion engine, a fuel nozzle, an air nozzle movable within and adapted to close the fuel nozzle, an auxiliary air inlet, a valve in said inlet, a cam controlled by said valve and adapted to limit the movement of said air nozzle.

4. In combination with an internal combustion engine, an atomizer for fuel, comprising an oil nozzle and a movable air nozzle within the oil nozzle, a valve operable from the engine controlling the admission of air, an auxiliary air inlet provided with a valve, a cam acting on said air nozzle to regulate its movement, and means connecting said valve and cam.

5. In combination with an internal combustion engine, a nozzle for the discharge of fuel under pressure, an auxiliary air inlet, a needle valve adapted to control the volume of fuel discharged from said nozzle, a valve in said auxiliary air inlet, and a cam controlled by said valve to regulate said needle valve.

6. In combination with an internal combustion engine, means adapted to atomize fuel under pressure above atmosphere, provided with passages for oil and air, an auxiliary air inlet, and means operable by the suction of the engine to regulate the admission of oil to the engine in proportion to the amount of air admitted.

7. In combination with an internal combustion engine, an atomizer for fuel having an outer nozzle for oil and an inner nozzle for air, valves operable by the engine to admit air to the atomizer during the intake stroke of the motor, a needle valve adapted to regulate the amount of oil admitted to the atomizer, and means operable by the suction of the engine to control the needle valve.

8. In an internal combustion engine, the combination with a nozzle for the discharge of fuel under pressure, of an auxiliary air inlet, means to control the amount of auxiliary air admitted to the engine, means to proportion the volume of fuel discharged from said nozzle to the amount of auxiliary air admitted, and means to supply a pressure medium to said nozzle.

9. In combination with an internal combustion engine, an atomizer for fuel comprising a fuel discharging member and an air discharging member and having ports for admission of air and oil, and spring actuated means normally shutting off the discharge of one of said fluids and adapted by the pressure of the incoming air to be retracted to allow the discharge of such fluid.

10. In combination with an internal combustion engine, an atomizer for fuel comprising an air discharging member and a fuel discharging member and having an air admission port, one of said members being movable relatively to the other to shut off the fuel discharge, a spring normally holding said movable member in its shut-off position, and means operable by the pressure of the incoming air to move the movable member, against the action of its spring, into position to open the fuel discharge.

11. In combination with an internal combustion engine, a nozzle to supply fuel, a hollow needle adapted to close said nozzle, a piston on said needle, a spring acting on said piston, and means to introduce air into said needle and at the same time act on said piston to withdraw said needle and open said nozzle.

In testimony of which invention, I have hereunto set my hand, at Wilmington, Del., on this 26th day of July, 1919.

ELEUTHERE PAUL DU PONT.